US009025231B2

(12) United States Patent
Dang et al.

(10) Patent No.: US 9,025,231 B2
(45) Date of Patent: May 5, 2015

(54) LASER SYSTEM FOR CREATING A LASER MARKING ON A SUBSTRATE

(75) Inventors: Lieu-Kim Dang, Gams (CH); Christoph Wuersch, Werdenberg (CH)

(73) Assignee: Hilti Aktiengesellschaft, Schaan (LI)

( * ) Notice: Subject to any disclaimer, the term of this patent is extended or adjusted under 35 U.S.C. 154(b) by 242 days.

(21) Appl. No.: 13/495,352

(22) Filed: Jun. 13, 2012

(65) Prior Publication Data
US 2013/0016414 A1 Jan. 17, 2013

(30) Foreign Application Priority Data
Jun. 14, 2011 (DE) .......................... 10 2011 077 508

(51) Int. Cl.
*G02B 26/08* (2006.01)
*G01C 15/00* (2006.01)

(52) U.S. Cl.
CPC ..................... *G01C 15/002* (2013.01)

(58) Field of Classification Search
CPC .............. G11B 7/007; G11B 7/00718; G11B 7/00736; G11B 7/00745; G02B 26/10; G02B 26/105

USPC ...................... 359/223.1–226.1, 643; 347/225
See application file for complete search history.

(56) References Cited

U.S. PATENT DOCUMENTS

| | | | |
|---|---|---|---|
| 2010/0033789 A1 | 2/2010 | Lukic et al. | |
| 2010/0141729 A1 * | 6/2010 | Petsch et al. | 347/225 |

FOREIGN PATENT DOCUMENTS

| | | |
|---|---|---|
| DE | 2364756 | 7/1975 |
| DE | 199 28 084 | 12/2000 |
| DE | 10 2006 037 922 | 2/2008 |
| DE | 10 2008 027 891 | 4/2009 |
| DE | 10 2008 041 031 | 2/2010 |
| DE | 10 2009 001 889 | 9/2010 |

\* cited by examiner

*Primary Examiner* — Euncha Cherry
(74) *Attorney, Agent, or Firm* — Davidson, Davidson & Kappel, LLC (57) ABSTRACT

A laser system (1) for creating a laser marking (23) on a substrate (4, 7), having a laser device (2) with a beam source (11) that emits a laser beam (14) along a first optical axis (16), and having a deflection unit (3) with a deflection lens (19) that deflects the laser beam (14) along a second optical axis (22), whereby the first and second optical axes (16, 22) are arranged at an angle of 90°, and the deflection unit (3) can be adjusted with respect to the laser device (2).

11 Claims, 8 Drawing Sheets

LASER SYSTEM FOR CREATING A LASER MARKING ON A SUBSTRATE

This claims the benefit of German Patent Application DE 10 2011 077 508.0 filed Jun. 14, 2011 and hereby incorporated by reference herein.

The present invention relates to a laser system for creating a laser marking on a substrate, as well as to a deflection unit for a laser system for creating a laser marking on a substrate.

BACKGROUND

Prior-art laser systems for creating a laser marking on a substrate comprise a laser device with a beam source that emits a laser beam along an optical axis. The laser beam is used in interior construction, among other things, for marking the position of dividing walls. In order to mark the position of a dividing wall using the familiar laser system, the laser device is oriented with respect to an existing reference surface, for example, a wall. In this context, the laser beam can be oriented parallel, perpendicular or at an angle with respect to the reference surface. The user transfers the laser marking onto the substrate as the marking for a first dividing wall. In order to mark a second parallel dividing wall, the user moves the laser device and once again orients the laser device with respect to the reference surface.

SUMMARY OF THE INVENTION

It is a drawback that the user has to repeat the orientation of the laser device with respect to the reference surface for each parallel marking. This creates extra work for the user and constitutes a potential source of error. The laser device has to be oriented precisely with respect to the reference surface for each parallel marking.

It is an object of the present invention to provide a laser system for creating a laser marking on a substrate which reduces the effort required by the user in order to orient the laser system. Moreover, the risk of deviations from the parallel orientation of several markings is to be reduced.

The present invention provides a laser system having a deflection unit with a deflection lens that deflects the laser beam along a second optical axis, whereby the first and second optical axes are arranged at an angle of 90°, and the deflection unit can be adjusted with respect to the laser device. Due to the adjustability of the deflection unit with respect to the laser device, the user only needs very little adjustment effort in order to create laser markings on several places on a substrate indicating, for example, the position of dividing walls. To start with, the user orients the laser device parallel, perpendicular or at an angle with respect to a reference surface and leaves the orientation of the laser device unchanged from that point on. Subsequently, the user positions the deflection unit at the place where the laser marking for the parallel dividing wall is to be created.

The beam source of the laser device emits a laser beam that propagates along a first optical axis. The emitted laser beam is configured as a point or linear laser beam that propagates in the direction of the first optical axis. The point or linear shape describes the beam shape of the laser beam in a plane perpendicular to the first optical axis. As an alternative, the laser beam that is aimed at the deflection lens can be generated by a laser device that is configured as a rotation laser and that is operated in a scanning mode. In the scanning mode, the lens and the laser beam rotate back and forth periodically between two reversal points. The part of the laser beam that is being moved back and forth and that strikes the deflection lens of the deflection unit is deflected by 90° by the deflection lens and it creates a laser marking on the substrate. In a rotation laser in the scanning mode, the first optical axis that runs through the mid-point of the laser beam being moved back and forth is defined as the main axis. When the rotation laser is oriented, the main axis of the laser beam that is being moved back and forth is oriented with respect to the reference surface.

In a preferred embodiment, the beam source is arranged in a first housing and the deflection lens is arranged in a second housing. Especially preferably, the beam source can be oriented on a first leveling device, irrespective of the orientation of the first housing, and the deflection lens can be oriented on a second leveling device, irrespective of the orientation of the second housing, with respect to a vertical direction determined by gravity. Since the beam source and the deflection lens are accommodated in separate housings, the distance from the deflection unit to the laser device can be set as desired. The use of the two independent leveling devices for the beam source and for the deflection lens ensures that the laser device and the deflection unit are oriented with respect to the vertical direction, irrespective of the substrate in question, so that the laser beams run in a horizontal beam plane.

The first leveling device for the beam source is preferably configured as a two-dimensional leveling device so that the laser beam is oriented in a horizontal plane that is perpendicular to the vertical direction. The second leveling device for the deflection lens is preferably configured as a one-dimensional or two-dimensional leveling device. A two-dimensional leveling device is advantageous if a plumb beam is decoupled from the laser beam by means of a beam splitting lens. The two-dimensional leveling device ensures that the plumb beam is oriented parallel to the vertical direction. A one-dimensional leveling device has the advantage over a two-dimensional leveling device that the structure of the leveling device is mechanically simpler and thus less expensive. In order to create a linear laser marking on the substrate, the deflected laser beam is moved back and forth in a direction perpendicular to the deflection plane and thus parallel to the vertical direction. Consequently, a precise orientation in this direction is not necessary and a one-dimensional leveling device is sufficient.

In a preferred embodiment, the second leveling device is configured as a passive leveling device. A passive leveling device has the advantage that it does not require a source of power, so that the deflection unit can be more compact in comparison to a deflection unit that requires a source of power for its operation.

Especially preferably, the deflection unit has a beam-shaping lens that widens the deflected laser beam in a direction perpendicular to a beam plane spanning the first and second optical axes. A beam-shaping lens is an optical element that shapes the deflected laser beam, and it is preferably configured as a cylinder lens, as a diffractive lens or as some other suitable beam-shaping lens. The beam-shaping lens widens the laser beam in such a way that a linear laser marking is created on the substrate and the visibility of the laser marking on the substrate is improved. In this process, the linear laser marking can be configured as a laser marking that is a continuous line, or as a laser marking that is an interrupted line consisting of several sections.

In a preferred embodiment, the beam-shaping lens is integrated into the deflection lens. With an integrated beam-shaping lens, there is no boundary surface between the beam-shaping lens and the deflection lens. The integrated beam-shaping lens has the advantage that the adjustment of the beam-shaping lens relative to the deflection lens is already performed when the deflection lens is manufactured, and only one support element is needed.

In an alternative preferred embodiment, the beam-shaping lens is directly adjacent to the deflection lens. When the beam-shaping lens is directly adjacent, the deflection lens and the beam-shaping lens have a shared boundary surface. No other optical element or medium with a different index of refraction such as, for instance, air, is situated between the optical surfaces of both of these two optical elements. The directly adjacent beam-shaping lens has the advantage that two different optical materials can be combined, as a result of which the properties of the optical system can be adapted more flexibly and successfully to the requirements. In spite of different optical materials, only one support element is needed, and the adjustment of the beam-shaping lens is already performed when the deflection lens is manufactured.

In a preferred embodiment, the second leveling device is configured as an active leveling device. With an active leveling device, adjustment units are used to orient the deflection lens with respect to the vertical direction. An active leveling device has the advantage that the adjustment units can be used to move the deflection lens back and forth in a direction parallel to the second optical axis of the deflected laser beam in order to create a linear laser marking on the substrate.

Especially preferably, the active leveling device can be operated in a scanning mode. In the scanning mode, an adjustment unit of the leveling device moves the deflection lens back and forth periodically around a tilting axis between two reversal points, whereby the tilting axis is arranged parallel to the first optical axis and thus perpendicular to the second optical axis. Due to the back-and-forth movement of the deflection lens, the deflected laser beam is moved back and forth periodically on the substrate, creating a highly visible linear laser marking on the substrate.

In a preferred embodiment, the deflection lens is configured as a pentaprism with an inlet surface, a first and a second reflection surface, as well as an outlet surface. A pentaprism is a transmissive optical element in the form of a five-sided prism, whereby four of the five surfaces are optically utilized. In the case of a pentaprism, a light beam entering the pentaprism via the inlet surface and a light beam that has exited from the pentaprism via the outlet surface are positioned perpendicular to each other. Since, in a pentaprism, the outlet angle of a light beam is perpendicular to the inlet angle, the deflection lens is invariant in terms of rotating, shifting or undergoing other deviations. The user merely has to ensure that the laser beam emitted by the beam source is emitted perpendicular to the reference surface. The first and second reflection surfaces of the deflection lens are already adjusted when the pentaprism is manufactured; the user does not have to adjust the reflection surfaces.

In another preferred embodiment, the deflection lens has a first and a second reflecting lens, whereby the reflection surfaces of the lenses enclose an angle of 45°. At an angle of 45° between the reflection surfaces of the lenses, the laser beam in front of the first reflection surface and the laser beam behind the second reflection surface are perpendicular to each other, independent of the incident angle of the laser beam with respect to the first reflection surface.

The first and second reflecting lenses are especially preferably attached to a shared support element. This has the advantage that changes resulting, for example, from temperature fluctuations of the support element act on both reflecting lenses to an equal extent, as a result of which they only cause a slight deviation from the adjusted position.

Preferably, the deflection unit has a beam splitting lens that splits the laser beam into a first partial beam and a second partial beam, whereby the second partial beam is emitted along an optical axis that runs perpendicular to the first and second optical axes. The additional beam splitter generates a plumb beam that strikes the substrate and creates a point laser marking there. The point laser marking on the substrate helps the user orient the laser marking exactly where the dividing wall is to be positioned. No adjustment work is required for this purpose; the user merely has to ensure that the laser beam strikes the deflection lens.

Preferably, the deflection unit has an additional deflection lens to deflect another laser beam that strikes the additional lens along an optical axis that is oriented opposite to the first optical axis, as an additional deflected laser beam along another optical axis, whereby the optical axes of the additional deflection lens are arranged at an angle of 90° and the optical axis of the additional deflected laser beam is oriented parallel to the optical axis of the first deflected laser beam. The additional deflection lens is especially preferably configured as an additional pentaprism or as a deflection lens with a first and a second reflecting lens whose reflection surfaces enclose an angle of 45°. A deflection unit that has two deflection lenses has the advantage that the laser device can be set up in two directions opposite from each other. Depending on the ambient conditions that the user encounters on site, he might be able to only orient the laser device in one direction. The two deflection lenses allow the user to depict linear laser markings in two directions.

The present invention also provides a deflection unit for a laser system for creating a laser marking on a substrate has a deflection lens that deflects a laser beam that strikes the deflection lens along a first optical axis so as to yield a laser beam that is deflected by 90° along a second optical axis.

The deflection unit is configured to be adjustable with respect to the incident laser beam. The deflection unit is configured to be independent of a laser device that emits the laser beam and that aims it at the deflection lens along the first optical axis; there is no need for the deflection unit to be coupled to or to be in communication with the laser device. Consequently, any desired laser device can be combined with the deflection unit according to the invention; the laser device generates the laser beam that strikes the deflection lens.

Embodiments of the invention will be described below with reference to the drawing. The drawing does not necessarily depict the embodiments true-to-scale, but rather, the drawing—where necessary for explanation purposes—is shown in schematic and/or slightly distorted form. Regarding any expansion of the teaching that can be directly gleaned from the drawing, reference is hereby made to the pertinent state of the art. Here, it has to be taken into account that many modifications and changes relating to the shape and to the detail of an embodiment can be made without deviating from the general idea of the invention. The features of the invention disclosed in the description, in the drawing as well as in the claims can be essential for the refinement of the invention individually as well as in any desired combination. Moreover, all combinations of at least two of the features disclosed in the description, in the drawing and/or in the claims fall within the scope of the invention. The general idea of the invention is not limited to the exact form or detail of the preferred embodiment shown and described below nor is it limited to a subject matter that would be limited in comparison to the subject matter put forward in the claims. At given rated ranges, values that fall within the specified limits are also to be disclosed as limit values and to be used and claimed as desired. For the sake of clarity, identical or similar parts or else parts with an identical or similar function are designated by the same reference numerals below.

BRIEF DESCRIPTION OF THE DRAWINGS

The following is shown.

DETAILED DESCRIPTION

Figure 1:
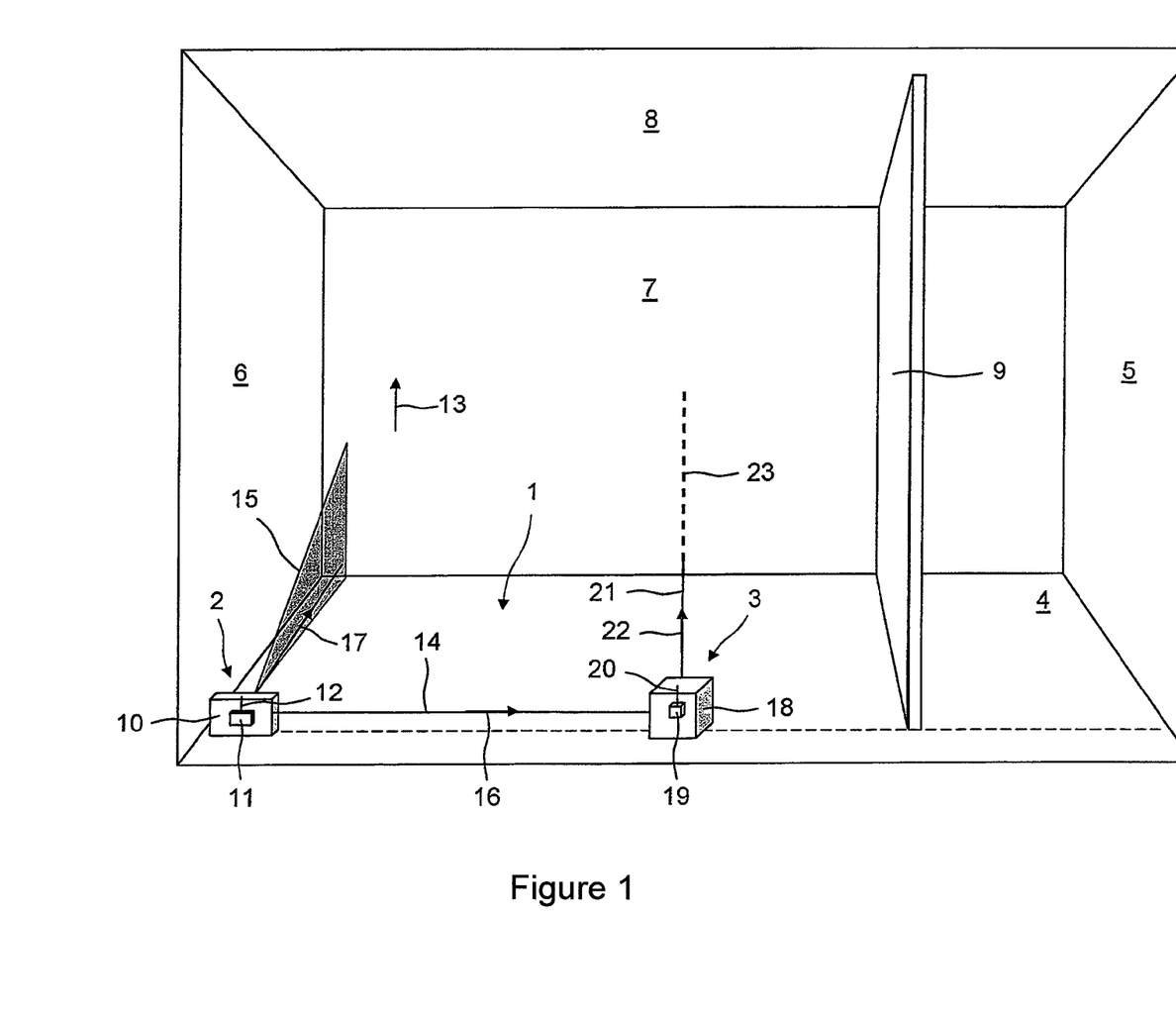
FIG. 1 a laser system according to the invention with a laser device, and a deflection unit, which are positioned on the floor and which create a linear laser marking on the floor and on a rear wall.

FIG. 1 shows a laser system 1 according to the invention for creating a laser marking on a substrate, in a schematic view. The laser system 1 includes a laser device 2 and a deflection unit 3.

The laser system 1 is used in interior construction for marking the position of dividing walls. FIG. 1 shows an interior space consisting of a floor 4, a right and a left side wall 5, 6, a rear wall 7, and a ceiling 8. Parallel to the left side wall 6, a dividing wall 9 has already been built. In order to use the laser system 1 to mark the position of additional dividing walls that run parallel to the left side wall 6, the laser device 2 is aimed at the left side wall 6.

The laser device 2 comprises a housing 10 and a laser beam source 11 that s arranged in the housing 10 and that is arranged on a leveling device 12. The leveling device 12 orients the laser beam source 11—irrespective of the orientation of the housing 10—with respect to the floor 4 parallel to a vertical direction 13 determined by gravity. The laser device 2 is configured as a combined point and linear laser device with a point or punctual beam 14 and a linear beam 15. The point beam 14 is emitted along a first optical axis 16 and the linear beam 15 is emitted along a second optical axis 17.

The laser device 2 is placed onto the floor 4 with the bottom of the housing 10 or with a device foot, and it is oriented in such a way that the point beam 14 runs perpendicular and the linear beam 15 runs parallel to the left side wall 6. A laser device that only emits a point beam or a linear beam is positioned in such a way that the optical axis of the point beam or of the linear beam is oriented with respect to the length side wall 6 or parallel with respect to the rear wall 7 or with respect to a front wall that is not shown in FIG. 1.

The deflection unit 3 comprises a housing 18 and a deflection lens 19 that is arranged in the housing 18 and that is arranged on a leveling device 20. The leveling device 20 orients the deflection lens 19—irrespective of the orientation of the housing 18 on the floor 4—parallel to the vertical direction 13. The deflection unit 3 is positioned on the floor 4 at the desired distance from the laser device 2 in such a way that the deflection lens 19 is situated in the beam path of the point beam 14. The deflection lens 19 deflects the point beam 14 into a deflected point beam 21. The deflected point beam 21 propagates along an optical axis 22 that runs perpendicular to the optical axis 16 of the point beam 14. The first optical axis 16 and the second optical axis 22 span a beam plane.

The deflected point beam 21 propagates within the beam plane and creates a point laser marking on the rear wall 7. In order to display a linear laser marking 23 on the floor 4 and/or on the rear wall 7, the point beam 21 has to be widened using a beam shaping lens or else the point beam has to execute a periodical back-and-forth movement in the direction of the optical axis 22.

Figure 2A:
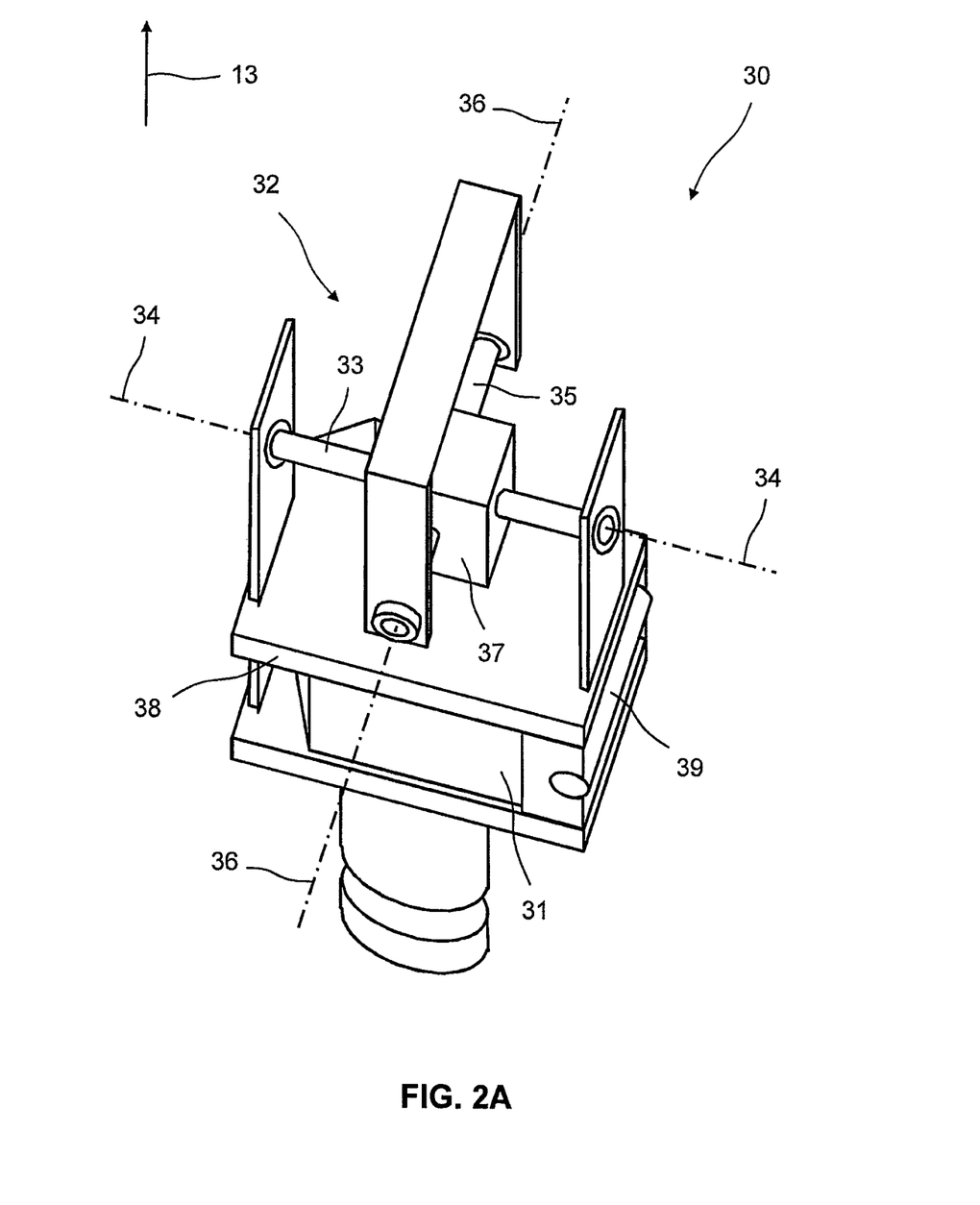
FIGS. 2A,B a first embodiment of a deflection unit with a passive leveling device (FIG. 2A), and a deflection lens configured as a pentaprism (FIG. 2B)
Figure 2B:
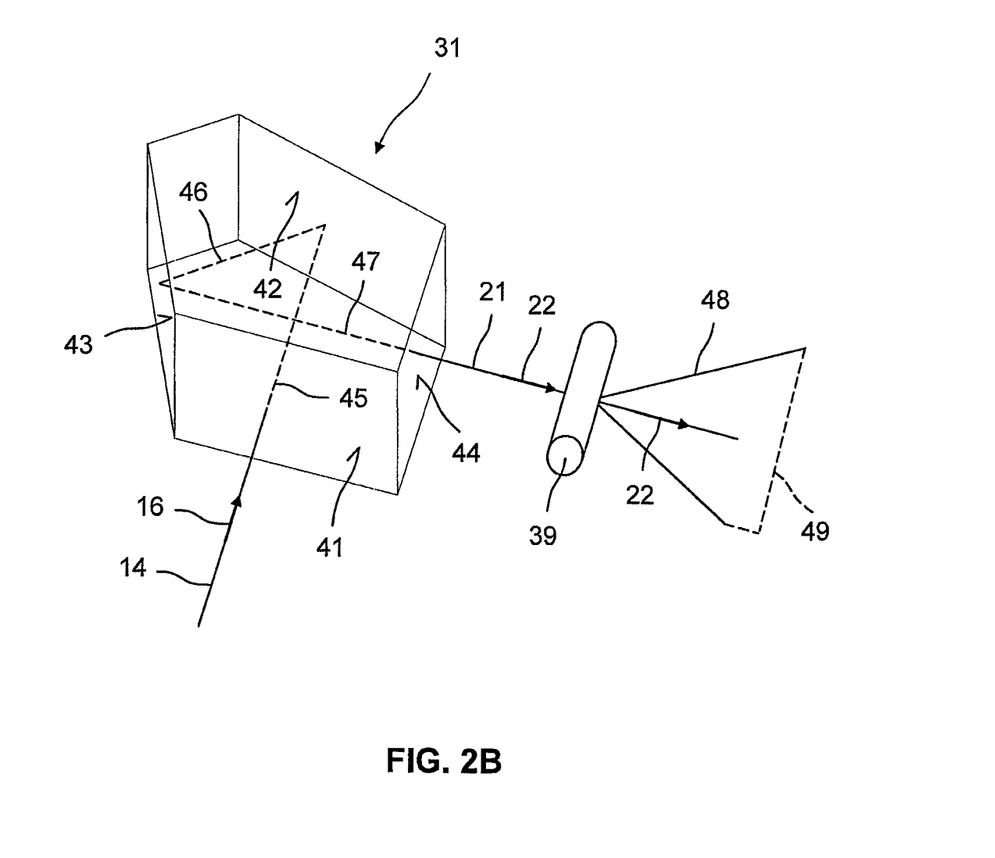

FIGS. 2A,B show a first embodiment of a deflection unit 30 that has a deflection lens 31 configured as a pentaprism as well as a passive leveling device 32. Here, FIG. 2A shows the pentaprism 31 that is attached to the passive leveling device 32, and FIG. 2B shows the pentaprism 31 in an enlarged view. The deflection unit 30 can replace the deflection unit 3 in the laser system 1.

The pentaprism 31 is mounted by means of the passive leveling device 32, which is configured as a two-dimensional leveling device, in such a way that it is self-leveling in the earth's gravitational field. The leveling device 32 comprises a first axis unit 33 that is oriented along a first pivoting axis 34, and a second axis unit 35 that is oriented along a second pivoting axis 36. The first axis unit 33 and the second axis unit 35 are coupled by means of a coupling element 37. The pentaprism 31 is connected via a support element 38 to the first axis unit 33 and to the second axis unit 35 of the leveling device 32.

As an alternative, the leveling device can be configured as a one-dimensional leveling device. The one-dimensional leveling device comprises the first axis unit 33 that is configured so as to pivot around the first pivoting axis 34. The second axis unit 35 is not necessary since pivoting the pentaprism 31 around the second pivoting axis 36 causes the deflected laser beam 21 to be rotated around itself. However, if the deflected laser beam 21 is supposed to be shaped by means of a beam shaping lens, then a two-dimensional leveling device is needed in order to prevent the direction of the beam shaping from being slanted.

The pentaprism 31 deflects the point beam 14 by 90° in the beam plane spanned by the optical axes 16, 22. In order to display a linear laser marking on the floor 4 and on the rear wall 7, the deflected point beam 21 is widened by a beam shaping lens 39. The beam shaping lens 39 is configured as a cylinder lens and is arranged in the beam path of the point beam 21 behind the pentaprism 31.

FIG. 2B shows the deflection lens 31 in an enlarged view. The deflection lens is configured as a pentaprism 31 with an inlet surface 41, a first reflection surface 42, a second reflection surface 43, and an outlet surface 44.

The point beam 14 enters the pentaprism 31 via the inlet surface 41 as an incoming point beam 45. The incoming point beam 45 is deflected at the first reflection surface 42 as a once-reflected point beam 46, and at the second reflection surface 43 as a twice-reflected point beam 47. The twice-reflected point beam 47 exits from the pentaprism 31 via the outlet surface 44 as a deflected point beam 21. The point beam 45 is deflected at the first and second reflection surfaces 42, 43 by 90°, and the optical axes 16, 22 of the incoming point beam 14 and of the deflected point beam 21 run perpendicular to each other. The deflected point beam 21 strikes the cylinder lens 39, which widens the point beam 21 to form a linear beam 48 that creates a visible laser marking 49 on the floor 4 and on the rear wall 7.

Figure 3A:
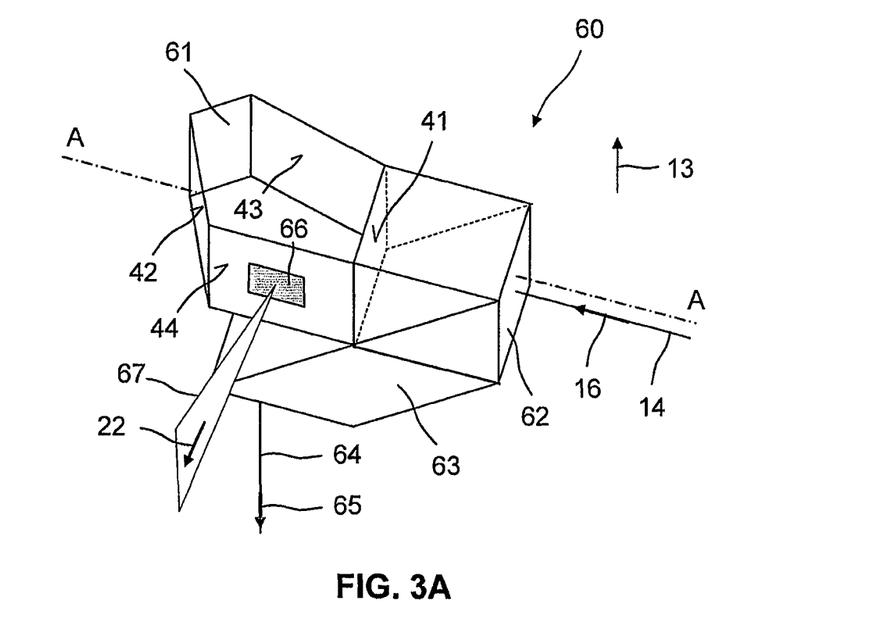
FIGS. 3A,B a second embodiment of a deflection unit with a deflection lens configured as a pentaprism, and a beam splitting lens in a three-dimensional view (FIG. 3A) as well as in a section along an axis A-A (FIG. 3B)
Figure 3B:
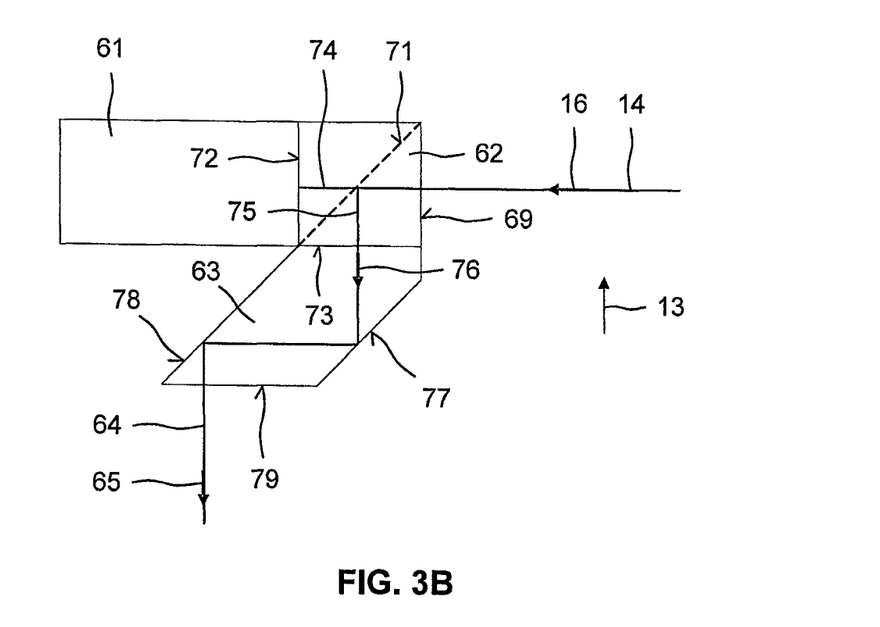

FIGS. 3A,B show a second embodiment of a deflection unit 60 that has a deflection lens 61 configured as a pentaprism, a beam splitting lens 62 and a displacement lens 63. FIG. 3A shows the deflection unit 60 in a three-dimensional view, while FIG. 3B shows it in a section along the sectional line A-A. The deflection unit 60 can replace the deflection unit 3 in the laser system 1.

The deflection unit 60 differs from the deflection unit 30 of FIGS. 2A,B in that, aside from the deflected point beam 21, a plumb beam 64 is generated that propagates along an optical axis 65 parallel to the vertical direction 13. The plumb beam 64 creates a point laser marking on the floor 4. With the deflection lens 61, in contrast to the deflection lens 31 which is likewise configured as a pentaprism, the four optical surfaces 41, 42, 43, 44 of the pentaprism are passed by the laser beam 21 in the opposite direction. Moreover, a beam-shaping lens 66 is integrated into the pentaprism 61.

The beam-shaping lens 66 is configured as a diffractive optical element. Diffractive optical elements split an incident laser beam into different orders of diffraction as a function of the angle, and they have the advantage that the laser beams can be shaped so as to acquire virtually any desired beam distribution. A diffractive optical element can be created subsequently in the deflection lens 61 by means of scanning structuring methods such as diamond cutting, laser beam printing or electron beam printing. The beam-shaping lens 66 widens the deflected point beam 21 in a direction that is parallel to the vertical direction 13 to form a linear beam 67 that propagates along the second optical axis 22.

FIG. 3B shows the deflection unit 60 with the pentaprism 61, the beam splitting lens 62 and the displacement lens 63 in a section along the sectional line A-A. The beam splitting lens 62 is situated in the beam path of the point beam 14 in front of the pentaprism 61.

The beam splitting lens 62 comprises an inlet surface 69, a splitting surface 71, a first outlet surface 72 and a second outlet surface 73. The first outlet surface 72 of the beam splitting lens 62 coincides with the inlet surface 41 of the pentaprism 61. The point beam 14 enters the beam splitting lens 62 via the inlet surface 69 and strikes the splitting surface 71. The splitting surface 71 splits the point beam 14 into a first partial beam 74 and a second partial beam 75. The first partial beam 74 enters the pentaprism 61 without deflection via the splitting surface 71 and the inlet surface 41. The second partial beam 72 is deflected at the splitting surface 71 along an optical axis 76 that runs perpendicular to the optical axis 16 of the point beam 14 and thus parallel to the vertical direction 13.

In order for the second partial beam, as a plumb beam 64, to display the mid-point of the deflection lens 61, the deflection unit 60 has the displacement lens 63. The displacement lens 63 comprises an inlet surface, a first and a second reflection surface 77, 78 as well as an outlet surface 79. The displacement lens 63 is directly adjacent to the second outlet surface 73 of the beam splitting lens 62, and the second outlet surface 73 of the beam splitting lens 62 coincides with the inlet surface of the displacement lens 63. The magnitude of the displacement of the second partial beam 75 is selected by means of the distance between the reflection surfaces 77, 78. The reflection surfaces 77, 78 are spaced with respect to each other in such a way that the plumb beam 63 and the mid-point of the deflection lens 61 coincide.

Figure 4A:
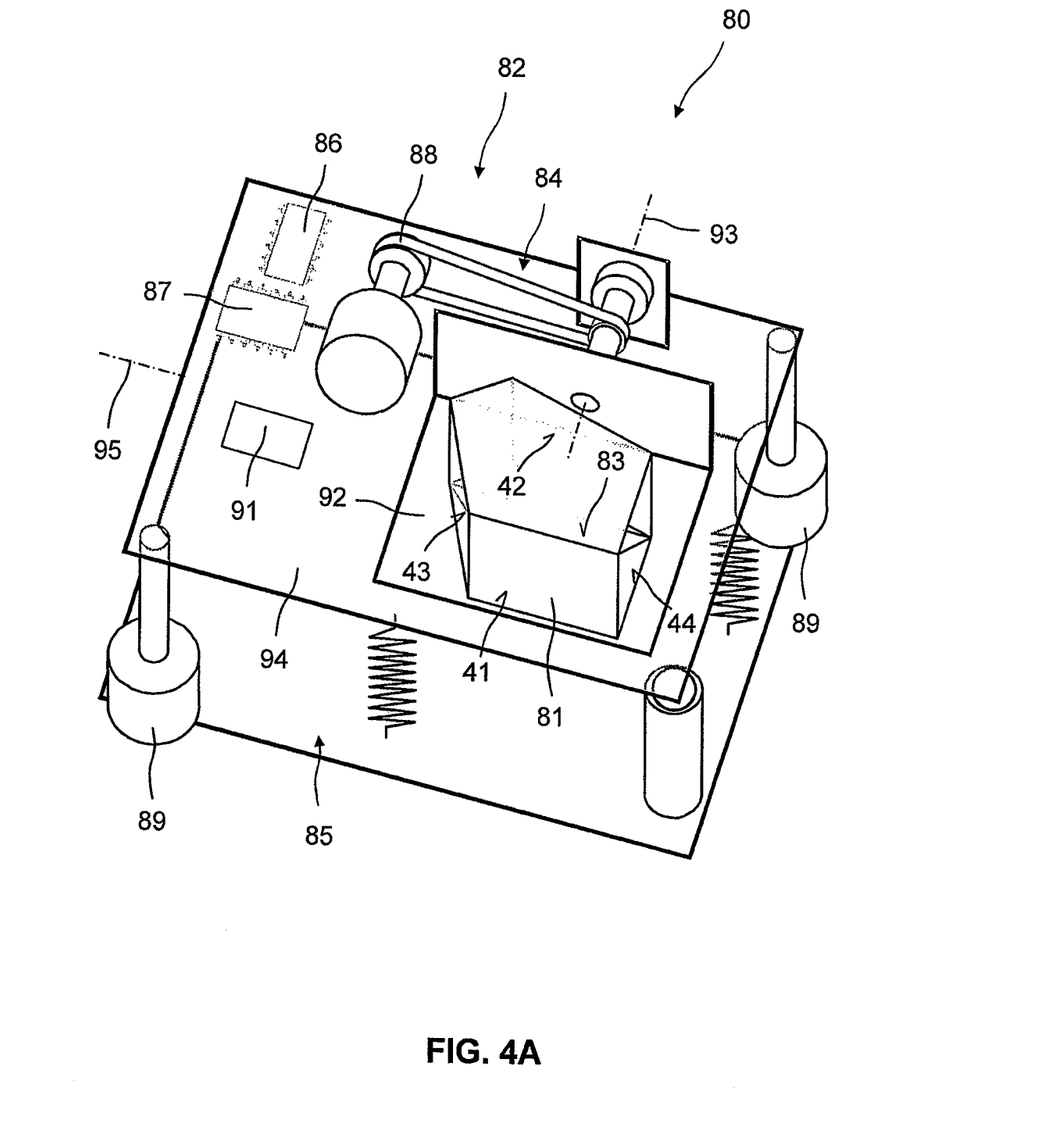
FIGS. 4A,B a third embodiment of a deflection unit with a deflection lens configured as a pentaprism and an active leveling device (FIG. 4A), whereby the deflection lens can be moved in a scanning mode of the active leveling device around a tilting axis between two reversal points (FIG. 4B)
Figure 4B:
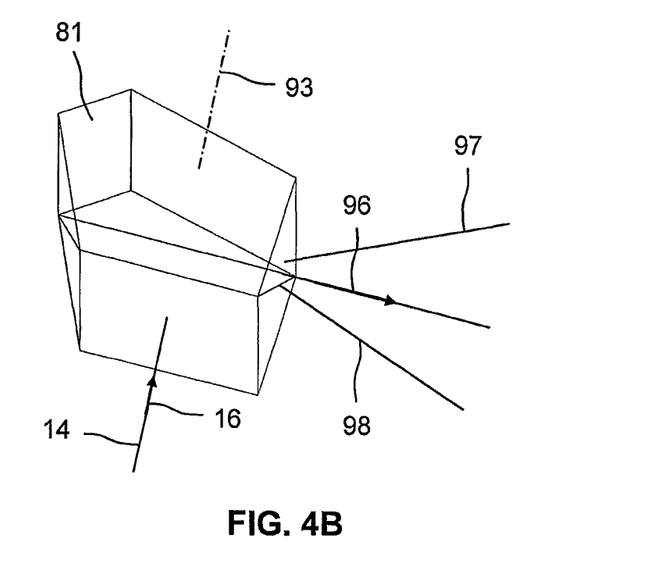

FIGS. 4A,B shows a third embodiment of a deflection unit 80 that has a deflection lens 81 configured as a pentaprism and an active leveling device 82, whereby the deflection lens 81 and the leveling device 82 are arranged in a housing. The deflection unit 80 can replace the deflection unit 3 in the laser system 1.

FIG. 4A shows the deflection unit 80 in a three-dimensional view. The deflection lens 81 is configured as a pentaprism having the inlet surface 41, the first reflection surface 42, the second reflection surface 43, as well as the outlet surface 44. Between the inlet surface 41 and the first reflection surface 43, there is a splitting surface 83 at which the incoming laser beam 14 is split into a first partial beam and a second partial beam.

The leveling device 82 is configured as an active leveling device with which the point beam 21—independent of the orientation of the housing of the deflection unit 80—is arranged on the substrate in a horizontal plane that is perpendicular to the vertical direction 13. The leveling device 82 comprises a first leveling unit 84 and a second leveling unit 85. The leveling units 84, 85 each comprise a sensor device 86, 87 and an adjustment device 88, 89. The leveling device 82 is controlled by means of a control device 91.

The deflection lens 81 is attached to a first support element 92. The first support element 92 is configured to be adjustable around a first tilting axis 93 by means of the first leveling unit 84. The first leveling unit 84 is attached to a second support element 94. The second support element 94 is configured so that it can tilt around a second tilting axis 95 by means of the second leveling unit 85. The first tilting axis 93 is oriented perpendicular to the inlet surface 41 of the deflection lens 81 and the second tilting axis 95 is oriented perpendicular to the first tilting axis 93.

The deflection unit 80 is first oriented with respect to the vertical direction 13 by means of the first and second leveling units 84, 85. The laser device 10 emits the point beam 14 that enters the deflection lens 81 via the inlet surface 41 and that is split at the splitting surface 83 into a first partial beam and a second partial beam. The second partial beam exits from the deflection lens 81 as a plumb beam parallel to the vertical direction 13 and it helps the user to position the deflection unit 80 at the desired place. The first partial beam is deflected in the horizontal plane perpendicular to the vertical direction 13 by 90° by the deflection surfaces 42, 43 of the pentaprism 81.

The visible laser marking on the floor 4 and on the rear wall 7 is created by means of the first leveling unit 84. The first leveling unit 84 has a scanning mode that is shown in FIG. 4B. In the scanning mode, the deflection lens 81 is moved by means of the first leveling unit 84 periodically back and forth around the first tilting axis 93 between two reversal points. The scanning mode of the first leveling unit 84 can be adjusted by means of the control device 91. The deflected laser beam is moved back and forth between two reversal points. An axis that is defined as the main axis 96 runs through the mid-point of the laser beam that is moved back and forth. The laser beams that are generated in the reversal points are designated by the reference numerals 97, 98.

Figure 5A:
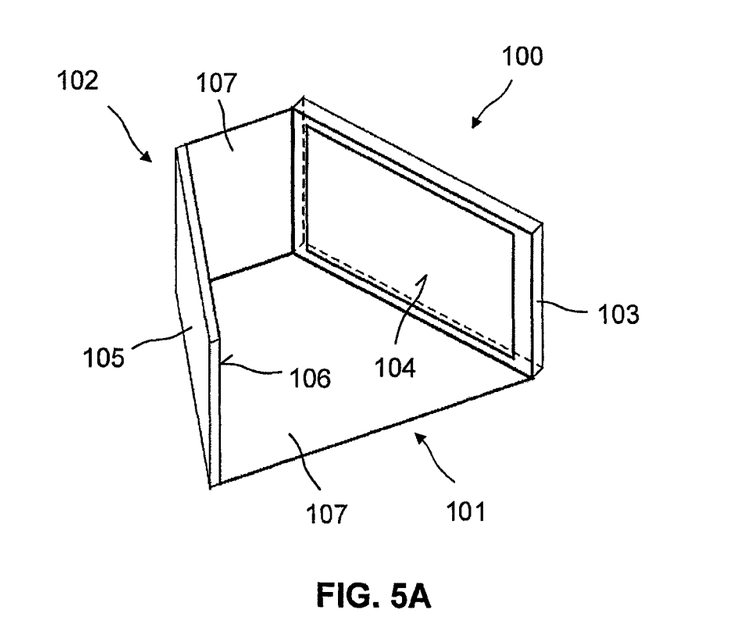
FIGS. 5A,B a fourth embodiment of a deflection unit with a first and a second reflecting lens whose reflection surfaces are arranged at an angle of 45° with respect to each other, in a three-dimensional view (FIG. 5A) and in a view from the top (FIG. 5B)
Figure 5B:
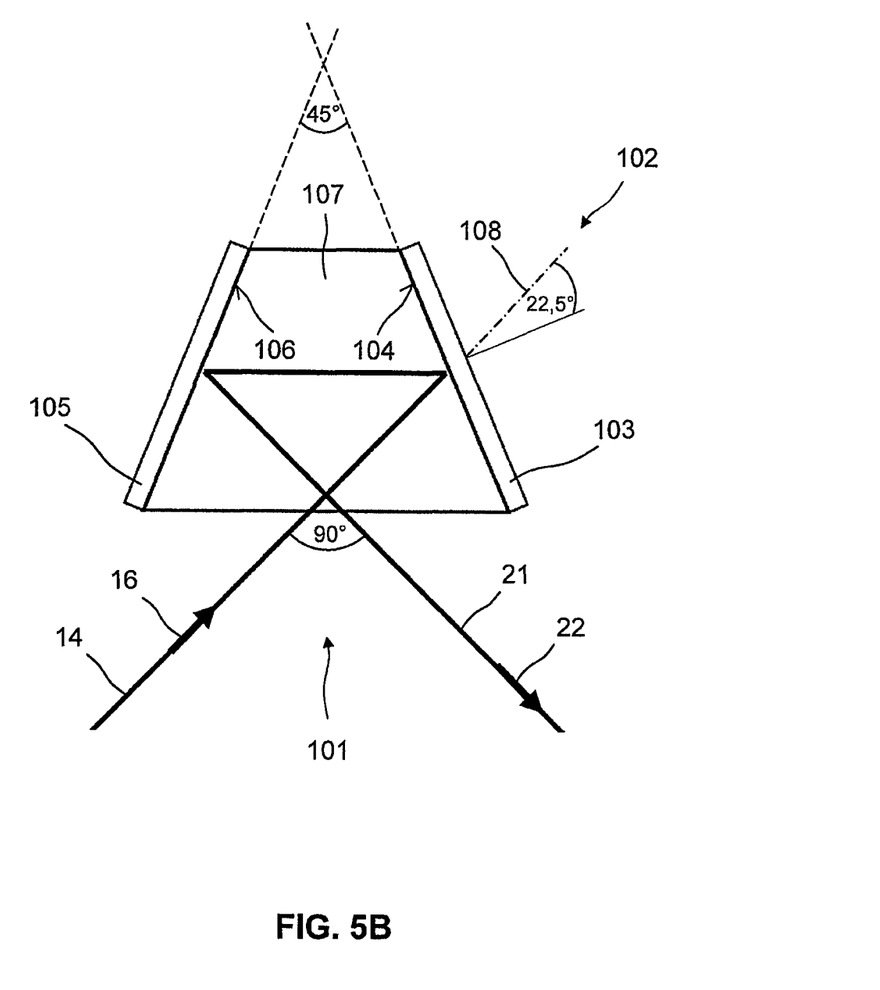

FIGS. 5A,B show a fourth embodiment of a deflection unit 100 that has a deflection lens 101 and a leveling device 102 that is configured as an active leveling device analogously to the active leveling device 82 of FIG. 4A. The deflection unit 100 can replace the deflection unit 3 in the laser system 1.

FIG. 5A shows the deflection unit 100 in a three-dimensional view. The deflection lens 101 has a first reflecting lens 103 with a first reflection surface 104 as well as a second reflecting lens 105 with a second reflection surface 106. The reflection surfaces 104, 106 of the two reflecting lenses 103, 105 enclose an angle of 45°. The first and second reflecting lenses 103, 105 are attached to a shared support element 107 and are connected to the leveling device 102 by means of the support element 107.

FIG. 5B shows the deflection unit 100 in a view from the top. The point beam 14 strikes the first reflection surface 104 where it is deflected, and subsequently strikes the second reflection surface 106. The user merely has to make sure that the point beam 14 strikes the first reflection surface 104 at an angle of approximately 22.5°±10°. At an incident angle of 0°, the laser beam is reflected into itself and no deflected laser beam exits from the deflection lens 101.

At an angle of 45° between the reflection surfaces 104, 106 of the reflecting lenses 103, 105, the laser beam in front of the first reflection surface 104, i.e. the point beam 14, and the laser beam behind the second reflection surface 106, i.e. the point beam 21, are oriented perpendicular to each other. The perpendicular orientation of the two laser beams 14, 21 is present in the angle range between approximately 22.5°±10°, irrespective of the precise incident angle between the laser beam 14 and the first reflection surface 104. Here, the incident angle is 0° when it strikes a reflection surface perpendicularly.

In order to display a linear laser marking on the floor 4 and on the rear wall 7, the leveling device 102 can be operated in a scanning mode. In the scanning mode, the deflection lens 101 is moved back and forth around a tilting axis 108 that coincides with a leveling axis. The tilting axis 108 is slanted by an angle of 22.5° with respect to the normal of the first reflection surface 104.

Figure 6:
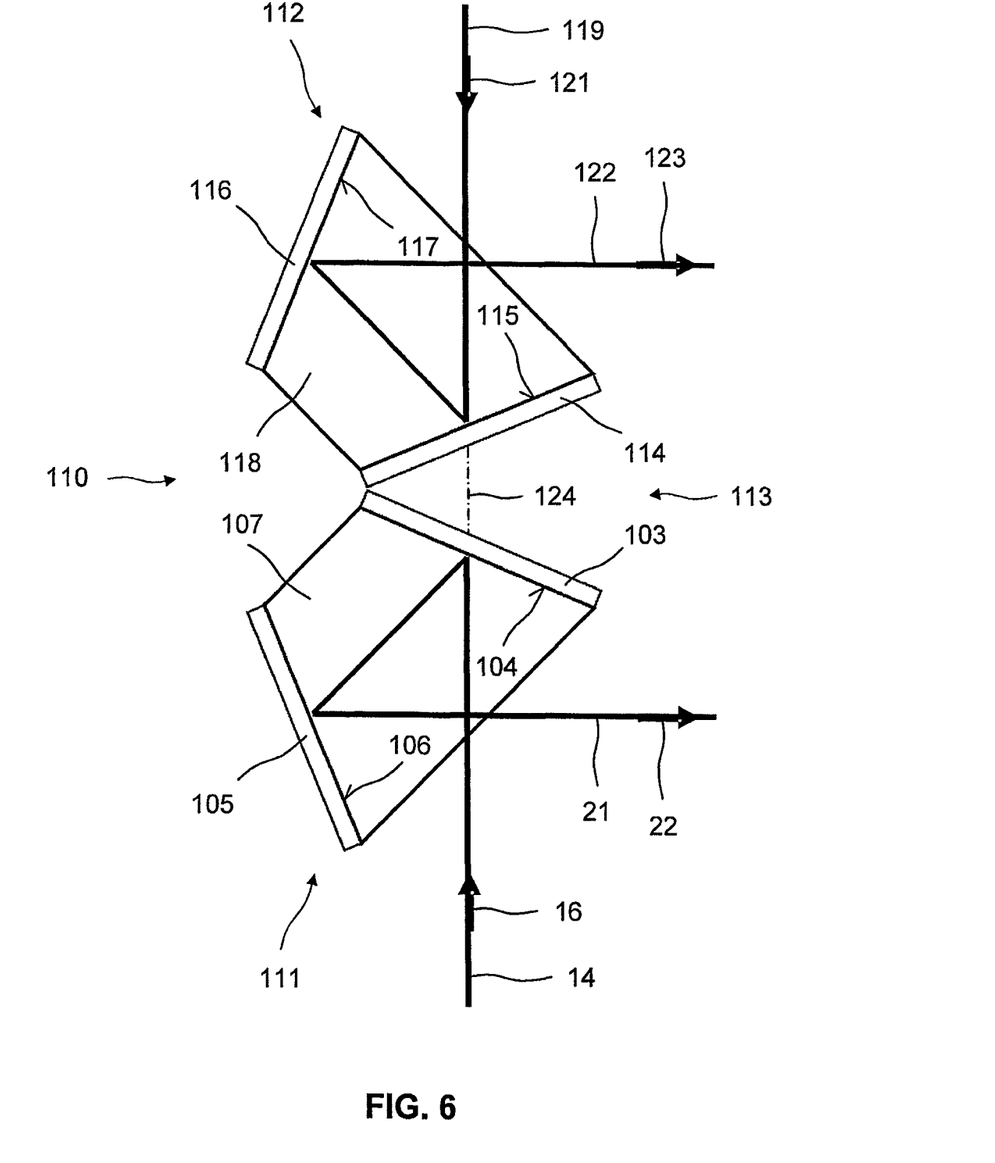
FIG. 6 a fifth embodiment of a deflection unit with the first and the second reflecting lenses of FIG. 5A as well as a third and a fourth reflecting lens whose reflection surfaces are arranged at an angle of 45° with respect to each other.

FIG. 6 shows a fifth embodiment of a deflection unit 110 that has a first deflection lens 111 and a second deflection lens 112. The first and second deflection lenses 111, 112 are attached to a leveling device 113 that is configured as an active leveling device analogously to the active leveling device 82 of FIG. 4A. The deflection unit 110 can replace the deflection unit 3 in the laser system 1.

The first deflection lens 111 corresponds to the deflection lens 101 of FIG. 5A and comprises the first and second reflecting lenses 103, 105 with the first and second reflection surfaces 104, 106, which enclose an angle of 45°. The second deflection lens 112 comprises a third reflecting lens 114 with a third reflection surface 115 as well as a fourth reflecting lens 116 with a fourth reflection surface 117. The third and fourth reflecting lenses 114, 116 are attached to a shared support element 118. The third and fourth reflection surfaces 115, 117 enclose an angle of 45°.

The point beam 14 propagates along the first optical axis 16, strikes the first reflection surface 104 where it is deflected and subsequently strikes the second reflection surface 106. A point beam 119, which propagates parallel to the point beam 14 but in the opposite direction along a third optical axis 121, strikes the third reflection surface 115 where it is deflected and subsequently strikes the fourth reflection surface 117. The point beam is deflected as a deflected point beam 122 at the fourth reflection surface 117 along an optical axis 123 that runs perpendicular to the optical axis 121 of the point beam 119.

The active leveling device 113 has a scanning mode in order to move the deflected laser beams 21, 122 back and forth between two deflection points. In the scanning mode, the first and second deflection lenses 111, 112 are moved back and forth around a tilting axis 124 that coincides with a leveling axis of the leveling device 113. The tilting axis 124 is slanted by an angle of 22.5° with respect to the normal of the first reflection surface 104 and with respect to the normal of the third reflection surface 115.

FIG. 6 shows an embodiment in which the first and second deflection lenses 111, 112 are tilted together around the tilting axis 124. As an alternative, the first deflection lens 111 can be tilted by a first adjustment device while the second deflection lens 112 can be tilted by a second adjustment device around the tilting axis 124 independently of each other.

What is claimed is:

1. A laser system for creating a laser marking on a substrate, comprising:
    a laser device with a beam source emitting a laser beam along a first optical axis and with a first leveling device, wherein the beam source is arranged in a first housing and can be oriented on the first leveling device, irrespective of an orientation of the first housing, with respect to a vertical direction determined by gravity;
    a deflection unit with a deflection lens deflecting the laser beam as a deflected laser beam along a second optical axis and with a second leveling device wherein the deflection lens is arranged in a second housing and can be oriented on the second leveling device, irrespective of the second housing, with respect to the vertical direction determined by gravity,
    the first and second optical axes being arranged at an angle of 90° and the deflection unit being adjustable with respect to the laser device.

2. The laser system as recited in claim 1 wherein the second leveling device is configured as a passive leveling device.

3. The laser system as recited in claim 2 wherein the deflection unit includes a beam-shaping lens widening the deflected laser beam in a direction perpendicular to a beam plane that spans the first and second optical axes.

4. The laser system as recited in claim 3 wherein the beam-shaping lens is integrated into the deflection lens.

5. The laser system as recited in claim 3 wherein the beam-shaping lens is directly adjacent to the deflection lens.

6. The laser system as recited in claim 1 wherein the second leveling device is configured as an active leveling device.

7. The laser system as recited in claim 6 wherein the active leveling device has a scanning mode.

8. The laser system as recited in claim 1 wherein the deflection lens includes a pentaprism with an inlet surface, a first and a second reflection surface, and an outlet surface.

9. The laser system as recited in claim 1 wherein the deflection lens includes a first and a second reflecting lens with a first and a second reflection surface, the first and second reflection surfaces of the lenses enclosing an angle of 45°.

10. The laser system as recited in claim 1 wherein the deflection unit includes a beam splitting lens splitting the laser beam into a first partial beam and a second partial beam, the second partial beam being emitted along an optical axis perpendicular to the first optical axis.

11. The laser system as recited in claim 1 wherein the deflection unit includes another deflection lens deflecting another laser beam striking the additional lens along an optical axis oriented opposite to the first optical axis, to define an additional deflected laser beam along another optical axis, the oppositely oriented optical axis and the other axis of the additional deflection lens being arranged at an angle of 90° and the other optical axis being oriented parallel to the second optical axis.

* * * * *